Oct. 27, 1953 J. C. S. BRANSON ET AL 2,657,265

AMPLIFYING DEVICE FOR USE WITH TELEPHONE APPARATUS

Filed Oct. 24, 1950 3 Sheets--Sheet 1

INVENTORS
John Charles Sydney Branson.
Leslie Clifford Branson.
BY Richardson, David and Nordon
their AGENTS Oct. 27, 1953 J. C. S. BRANSON ET AL 2,657,265

AMPLIFYING DEVICE FOR USE WITH TELEPHONE APPARATUS

Filed Oct. 24, 1950 3 Sheets-Sheet 2

INVENTORS,
John Charles Sydney Branson.
Leslie Clifford Branson.
BY Richardson, David and Nordon
their AGENTS.

Oct. 27, 1953 J. C. S. BRANSON ET AL 2,657,265

AMPLIFYING DEVICE FOR USE WITH TELEPHONE APPARATUS

Filed Oct. 24, 1950 3 Sheets-Sheet 3

INVENTORS,
John Charles Sydney Branson,
Leslie Clifford Branson.
BY Richardson, David and Nordon
their AGENTS Patented Oct. 27, 1953

2,657,265

UNITED STATES PATENT OFFICE 2,657,265

AMPLIFYING DEVICE FOR USE WITH TELEPHONE APPARATUS

John Charles Sydney Branson, Harborne, Birmingham, and Leslie Clifford Branson, Leicester, England Application October 24, 1950, Serial No. 191,798
In Great Britain January 23, 1948

8 Claims. (Cl. 179—1)

This invention relates to an amplifying device for use with telephone and is concerned with telephones of the hand-set type in which the mouth-piece and ear-piece are formed in a one-piece unit which is hereinafter referred to as the hand-set.

When using a telephone it frequently happens that the caller has to wait for a period until the conversation can commence due to delay at the respondent's end of the line. This delay may be caused by the respondent being absent or having gone to obtain information, or the delay may be encountered when putting through a long-distance or other call. Whatever the cause of the delay the initiator of the call must wait for some period, holding the hand-set in position until the respondent commences to speak. Valuable time may be wasted and the waiting period is also tiring and inconvenient.

Further, when using a telephone one hand of the user is occupied in holding the hand-set in position and it frequently happens that a person is interrupted by a telephone call and is forced to cease work and devote one hand to dealing with the telephone.

There have been numerous proposals to provide amplifying devices for use with hand-set telephones so that conversation could be carried on without having to hold the telephone and generally these have included an amplifier for receiving and amplifying the incoming signals from the ear-piece and a microphone and amplifier circuit for transmitting outgoing signals to the mouth-piece. On one arrangement the hand-set has been supported on a pillar and a tube, perforated at one end, has been provided for collecting and directing the outgoing sound into the mouth-piece.

A disadvantage of such prior proposals has been that they entail more than one piece of apparatus and do not provide complete self-contained unit such as is desirable for use on an office desk.

It has been proposed to provide a device for use with the old-fashioned type of telephone which has a separate ear-piece and in this case an amplifier unit for the ear-piece and sound tube for the mouth-piece have been provided in one cabinet.

The object of the present invention is to provide an amplifying device for use with telephones of the hand-set type and a device which can be made as a complete unit of such size as to be easily accommodated on an office desk or a table.

With this object in view, according to the invention an amplifying device for use with telephones of the hand-set type comprises a cabinet having a rest for the telephone hand-set, a thermionic valve amplifier housed within the cabinet, means in register with the telephone ear-piece for receiving an incoming message therefrom and for feeding same to said amplifier as an electrical signal, said amplifier having an output circuit connected, or adapted to be connected, to a loudspeaker; and a sound guide formed in the cabinet adapted to receive sound and direct such sound into the mouth-piece of the hand-set, said sound guide being in communication with a part of the cabinet which is adapted to receive the mouth-piece of the hand-set.

The amplifier circuit may include a switch of the press-button, spring-loaded type and this switch may be located upon the cabinet in such a position that when a hand-set is placed in position upon the cabinet it will have a part resting upon the switch and holding it in the closed position.

The amplifier circuit may be energised by a battery housed inside the cabinet, or the device may be adapted for operation from the electric supply mains.

The components of the amplifier circuit may be housed inside the cabinet and provision may be made for the inclusion of the loud-speaker in the cabinet or the loud-speaker may be separate from the cabinet.

In order to provide a complete self-contained unit it is preferable to house the loud-speaker within the cabinet and with this arrangement it is found in practice that the use of a conventional microphone for receiving the incoming message is not entirely satisfactory because the effect of acoustic feed-back due to the microphone and loud-speaker being in close proximity gives rise to considerable oscillation in the circuit and in order to eliminate this oscillation the volume strength of sound reproduction has to be considerably reduced. The effect may be overcome to a large degree by lagging the microphone and loud-speaker with sound-proof material and interposing in the device, barriers of such material to block all paths along which sound might travel from the loud-speaker to the microphone.

However, to eliminate acoustic feed-back by the above method would tend to complicate the device and add materially to the cost of production and it is therefore desirable in such a case to use some method of sound amplification and reproduction which will not be subject to the effect of acoustic feed-back.

Accordingly, in a further aspect of the invention the device comprises a cabinet having a rest for the telephone hand-set, a thermionic valve amplifier housed within the cabinet, means in register with the telephone ear-piece for receiving an incoming message therefrom and for feeding same to said amplifier as an electric signal, said means including a winding so arranged as to be coupled inductively with an electrical circuit in the hand-set in which flows current variable in accordance with said incoming message, said amplifier having an output circuit connected to a loud-speaker housed within the cabinet; and a sound guide formed in the cabinet adapted to receive sound and direct such sound into the mouth-piece of the hand-set, said sound guide being in communication with a part of the cabinet which is adapted to receive the mouth-piece of the hand-set.

The winding which is coupled inductively is not responsive to the sound waves which come from the loud-speaker so that the problem of acoustic feed-back is eliminated and the loud-speaker may be housed inside the cabinet in close proximity to the remaining components of the device.

The winding may be formed as a coil on a soft iron or other suitable metal or composition core and this may be positioned so that when the hand-set is resting on the support, the ear-piece is adjacent the coil and the inductive coupling takes place between the coil and the electrical circuit in the ear-piece.

A further part of the present invention has relation to the inductive coupling device. Present-day telephones have the magnets of their ear-pieces disposed in different positions with respect to horizontal and vertical axes, that is considering the hand-set to be in a vertical position as it would normally occupy when used with this device.

In some cases the magnets of the telephones are disposed on a vertical line and in other cases they are disposed on a horizontal line and it is found that when a telephone is used, wherein the magnets are disposed on a line at right angles to the magnets in the inductive coupling, then the reception is adversely affected owing to the magnets being out of line.

Hence, according to a further part of the present invention the magnetic poles of the inductive coupling are arranged so that they lie on a line which is inclined to the vertical and the horizontal lines as aforesaid.

In order to get the best results the magnetic poles are so arranged as to lie on a line which is at 45 degrees to the vertical and in the preferred embodiment the arrangement is such that the upper pole is on the left-hand side of the vertical and the lower pole is on the right-hand side. It is found that such an arrangement with telephones having differently positioned magnetic poles can be used without adversely affecting the reception of incoming speech.

A further improvement or modification has reference to a thermionic valve amplifier used for amplifying the electrical signals generated in the inductive coupling device and feeding the loud-speaker.

According to this modification or improvement the amplifier includes an attenuator device connected to the amplifier circuit proper and presenting an impedance varying with frequency in such a manner as to reduce the amplification by the amplifier of input signals on those frequencies most prone to produce regenerative feed back.

Preferably, the attenuator is connected in the input circuit of the first stage of the amplifier circuit proper. For instance, it may be connected in parallel with the inductive coupling device, and present an impedance which decreases with frequency so that in the band of frequencies above 2.5 kilocycles the amplification is appreciably reduced and regenerative feed back tendencies are obviated at the overall gain level required for normal working.

The invention is illustrated in the accompanying drawings, wherein.

Figures 1, 2, 3, 4:
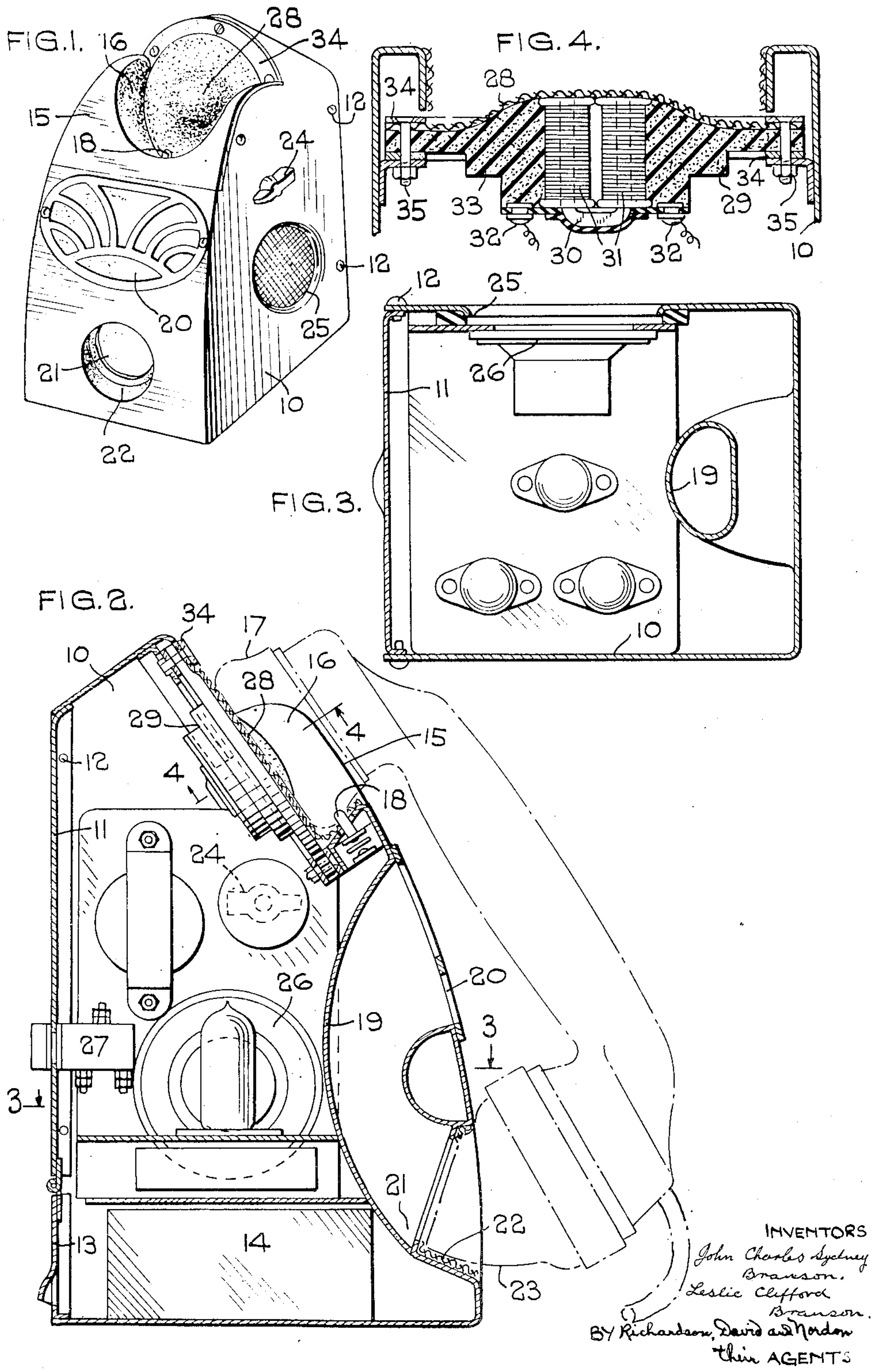
Figure 1 is a perspective view of one form of the device.
Figure 2 is a vertical section through the device shown in Figure 1.
Figure 3 is a section on the line 3—3 in Figure 2.
Figure 4 is a section on the line 4—4 in Figure 2.

In the construction shown the device is in the form of a cabinet which is formed with two vertical sides 10 of height greater than their width, the rear of the cabinet being closed by a panel 11 and the whole being made from metal, wood or plastic material, and shaped and finished so as to provide a pleasing outward appearance. The panel 11 is held in place by screws 12 and a hinged flap 13 is provided which gives access to the bottom of the cabinet in which is housed a battery 14.

At the top half of the front the cabinet has an inclined surface 15 which slopes upwardly and rearwardly and at the top there is provided a compartment 16 for receiving the telephone ear-piece 17.

The lower part of the ear-piece compartment 16 is of U shape or semi-circular so that when the ear-piece 17 of the telephone is placed in the compartment it will be located fixedly with respect to the cabinet. At the bottom, the ear-piece compartment 16 has a press-button switch projecting upwardly with a stud 18 on the outer end, the switch being of the spring-contact type, controlling the amplifier circuit and so arranged that when the ear-piece 17 is placed upon the cabinet it will rest upon the switch stud 18 and hold the switch in the closed position, thereby putting the amplifier circuit into operation.

In order to direct the speech from the user of the device into the telephone mouth-piece a sound guide is formed in the cabinet and as shown this comprises a horn 19 which is formed in the front part of the cabinet. The mouth 20 of the horn communicates with an aperture in the cabinet a short distance below the ear-piece compartment 16 and the mouth 20 of the horn extends between both sides of the cabinet and is of sufficient depth to provide a large mouth area to pick up speech from the user of the device.

The horn 19 extends downwardly inside the cabinet and converges to a substantially circular neck 21, the end of which is located towards the bottom of the front part of the cabinet and communicates with an aperture in the compartment 22 which is formed for receiving the telephone mouth-piece 23.

This latter compartment 22 takes the form of a recess in the lower front part of the cabinet and the sides of the recess are shaped to converge inwardly and take the shape of the telephone mouth-piece so that when the hand set is placed on the cabinet with the ear-piece 17 located in compartment 16, the mouth-piece 23 of the set will slide conveniently into its compartment 22 and be located directly over the neck 21 of the sound horn 19.

The various components of the amplifier circuit which are not shown in detail are housed inside the cabinet and a control knob 24 for the volume control is mounted upon one of the vertical sides 10 of the cabinet. This vertical side of the cabinet also has a circular aperture 25 and a loud-speaker 26 is secured to the inside of the cabinet directly behind this aperture 25. A jack plug 27 is provided for the purpose of using an alternative or extension loud-speaker.

The amplifier circuit may include a microphone which is fixed at the rear of compartment 16 and in such a construction the felt or fabric covering 28 (Figure 1) would have a circular hole at the centre thereof to permit sound to reach the microphone more easily. If a microphone is used it must be lagged with sound-proof material and also the loud-speaker would be lagged and every precaution taken to block all paths for sound between the loud-speaker and microphone so as to reduce to a minimum the effect of acoustic feed-back.

In the preferred embodiment of the invention an inductive coupling is used in place of the microphone and one form of inductive coupling is indicated generally at 29 in Figure 2 (in the position which the microphone would occupy in the arrangement mentioned in the previous paragraph). It is shown in detail in Figure 4 and comprises a U-shaped core 30 of soft iron or other suitable low reluctance composition upon which is wound a coil 31 the ends of which are taken to terminals 32. The core and its winding are mounted in a rubber housing 33 which is secured to the cabinet by means of a clamping ring 34 and screws 35. The felt or fabric cover 28 is also fastened in place by the ring 34.

The housing 33 is flexible so that when the telephone ear-piece 17 is in position the ends of the U-shaped core and winding are pressed resiliently against the ear-piece.

It will be understood that the current which flows in the circuit within the telephone hand-set varies in accordance with the incoming telephone's message and this causes induced currents to flow in the winding 31 which is thus said to be coupled inductively with the electrical circuit within the telephone hand set. The induced currents thus produced comprise the electrical signals which are fed to the amplifier in the normal way.

The use of a soft iron core for the winding is particularly advantageous as this core serves to concentrate the stray magnetic field of the telephone's ear-piece thus increasing the magnetic flux through the winding and increasing the magnitude of the induced current.

With an inductive coupling such as this the effect of acoustic feed-back (i. e. sound from the loud-speaker) is entirely eliminated because this form of coupling is not effected by sound waves whereas a conventional microphone depends upon sound waves for its operation.

When using the device the initiator of the telephone call places the hand set on the cabinet as in Figure 2, then dials the number in the normal way, and has merely to wait until the respondent answers. The initiator of the call can then carry on the conversation by speaking so as to direct his voice in the direction of the sound horn 19, the respondent's conversation being amplified and reproduced through the loud-speaker 26, or the caller, if he wishes, can use the phone in the usual manner. If the call has been previously ordered he can, on the call coming through, place the receiver on the device and carry on the conversation as above described.

Thus, after having initiated the call there is no further need for the user to touch the telephone and a person using this device is enabled to carry on work using both hands, and at the same time carry on a telephone conversation.

Figures 5, 6, 7, 8:
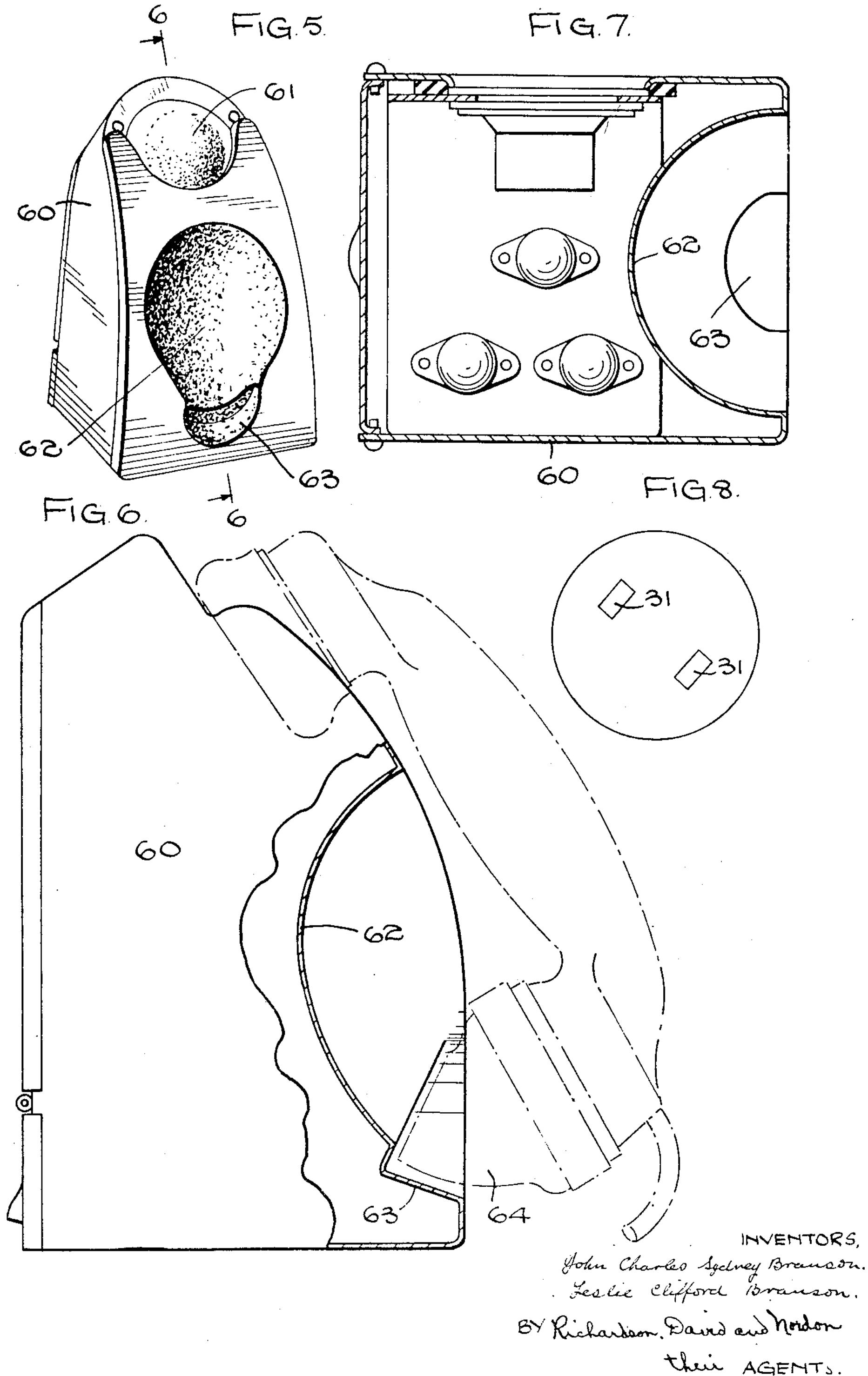
Figure 5 is a perspective view of an alernative form of the device.
Figure 6 is a section on line 6—6 in Figure 5.
Figure 7 is a section in plan.
Figure 8 is a diagrammatic view of a detail of the inductive coupling.
Figure 9:
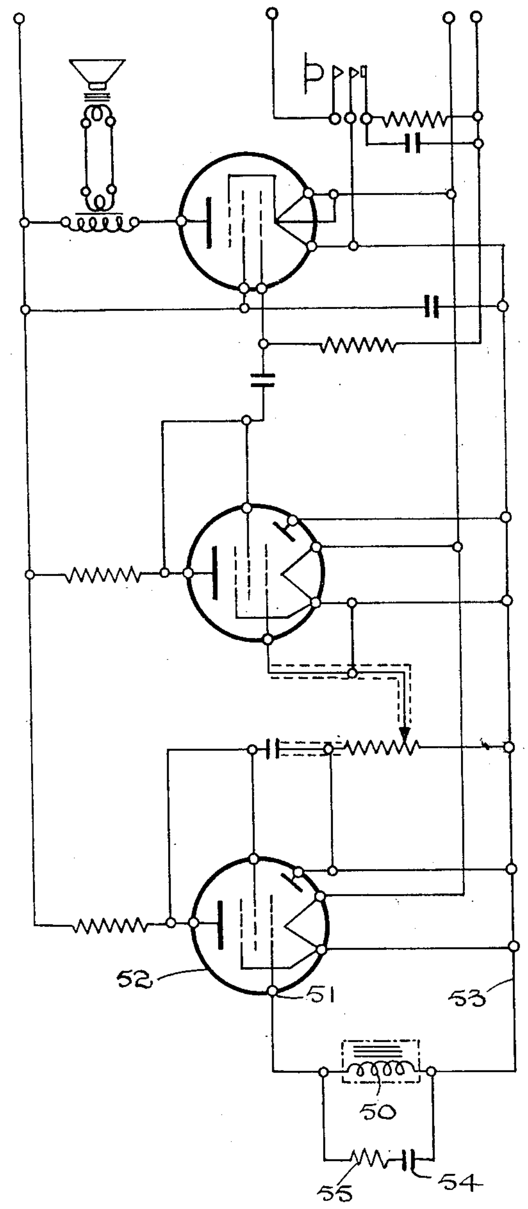
Figure 9 is a circuit diagram.

An alternative form of the device is shown in Figures 5, 6 and 7 and in this form the cabinet 60 and the compartment 61 which receives the ear-piece of the telephone are formed as in the previous construction, but in place of the horn of the previous construction a sound guide is provided in the form of a bowl shaped recess which is indicated generally at 62.

As seen in Figure 6 this is of substantially concave configuration and from the front is of pear shape. The lower part is formed as a compartment 63 which is shaped so as to receive the telephone mouth-piece 64. The remainder of the components of the device are as in the previous construction.

The specially shaped recess 62 provides sound guiding and directing means and it is found in practice that this arrangement has certain advantages over the horn, in that it provides a wider range for the device and it is possible for the mouth-piece 64 to pick up sound when the user is standing at some distance away from the device and at an angle to the front of the cabinet.

A further feature of the invention has relation to Figure 8 which shows diagrammatically the arrangement of the magnetic poles 31 of the inductive coupling. As seen in Figure 8 which is a view from the front of the poles 31 lie upon a line which is inclined to the vertical line between them and in the preferred construction the angle of inclination is 45°.

It is found with this arrangement that the inductive coupling will function equally as well when the telephone ear-piece has its magnetics disposed on a vertical line or on a horizontal line. The inclination of 45° is found to give the best results having regard to the two different types of telephone which may be met with in practice.

In one circuit arrangement as shown in the accompanying drawings, a conventional three-stage amplifier has the inductive coupling device 50 connected between the control grid 51 of the amplifying valve 52 of the first stage and the common earth or chassis line 53 which is joined to one filament terminal of each valve.

The attenuator comprises a condenser 54 of 0.01 micro-farad capacity or thereabouts, connected in series with a resistance 55 of 20,000 ohms, the whole being connected in shunt with the device 50.

This arrangement in combination with the normal grid-filament input capacity of the valve 52 provides a progressively low impedance path to earth or chassis as the frequency of the input signal increases beyond about 2.5 kilocycles (found to be the troublesome band of frequencies), whilst the presence of the resistance 55 reduces or obviates low frequency resonance of the condenser 54 with the inductive coupling device 50 in the range of frequencies below about 100 cycles.

Although this arrangement gives a satisfactory result, it would, of course, be within the scope of this part of the invention to employ a more complex low-pass filter either in the first stage of the amplifier or alternatively or additionally in one of more of the other stages.

What we claim then is:

1. An amplifying device for use with hand-set telephones comprising a cabinet having two side walls, a rear wall and a front wall which slopes rearwardly from the bottom of the cabinet to the top thereof, the upper part of the front wall having a recessed compartment of U-shape which forms a cradle to receive the telephone ear-piece, an inductive coupling mounted in the cabinet at the rear of said compartment so as to be in register with the telephone ear-piece when same is in position, a thermionic valve amplifier, connected electrically in circuit with said inductive coupling and housed within the cabinet, the lower part of the front wall of the cabinet being provided with a recessed compartment which is shaped to receive the mouth-piece of the telephone, and a sound guide provided at the front wall of the cabinet between said upper and lower compartments, the lower part of said sound guide being in communication with the said lower compartment in the front wall of the cabinet, and the upper part of the sound guide being in communication with an opening in the front wall of the cabinet between said upper and lower compartments, the said sound guide being so shaped and arranged as to direct sound from the user of the device into the telephone mouth-piece.

2. An amplifying device for use with hand-set telephones comprising a cabinet having two side walls, a rear wall and a front wall which slopes rearwardly from the bottom of the cabinet to the top thereof, the upper part of the front wall having a recessed compartment of U-shape which forms a cradle to receive the telephone ear-piece, an inductive coupling mounted in the cabinet at the rear of said compartment so as to be in register with the telephone ear-piece when same is in position, a thermionic valve amplifier, connected electrically in circuit with said inductive coupling and housed within the cabinet, the lower part of the front wall of the cabinet being provided with a recessed compartment which is shaped to receive the mouth-piece of the telephone, and a sound guide provided in the front wall of the cabinet between said upper and lower compartments, said sound guide being formed in the front wall of the cabinet as a recess of substantially concave configuration extending inwardly from the plane of the front wall of the cabinet, and the lower part of said recess being formed integrally with the said lower compartment in the front wall of the cabinet, said recess being so shaped and arranged as to direct sound from the user of the device into the telephone mouthpiece.

3. An amplifying device as claimed in claim 2, wherein the opening in the front wall defining the lower recess is substantially greater in area than the opening defining the upper recess in said wall.

4. An amplifying device as claimed in claim 2, wherein the recess in said front wall defining the sound guide is substantially greater in area than that of the mouthpiece of the telephone.

5. An amplifying device as claimed in claim 2, wherein the recess in said front wall defining the sound guide is substantially in the form of a bowl.

6. An amplifying device for use with hand-set telephones comprising a cabinet having two side walls, a rear wall and a front wall which slopes rearwardly from the bottom of the cabinet to the top thereof, the upper part of the front wall having a recessed compartment of U-shape which forms a cradle to receive the telephone ear-piece, an inductive coupling mounted in the cabinet at the rear of said compartment so as to be in register with the telephone ear-piece when same is in position, a thermionic valve amplifier, connected electrically in circuit with said inductive coupling and housed within the cabinet, said amplifier including a loud-speaker mounted upon one side wall of the cabinet, the said side wall having an opening with said loudspeaker in register therewith, the lower part of the front wall of the cabinet being provided with a recessed compartment which is shaped to receive the mouth-piece of the telephone, and a sound guide provided in the front wall of the cabinet between said upper and lower compartments, said sound guide being positioned in the front wall of the cabinet as a recess of substantially concave configuration extending inwardly from the plane of the front wall of the cabinet, and the lower part of said recess being formed integrally with the said lower compartment in the front wall of the cabinet, said recess being so shaped and arranged as to direct sound from the user of the device into the telephone mouthpiece.

7. An amplifying device for use with hand-set telephones comprising a cabinet having two side walls, a rear wall and a front wall which slopes rearwardly from the bottom of the cabinet to the top thereof, the upper part of the front wall having a recessed compartment of U-shape which forms a cradle to receive the telephone ear-piece, an inductive coupling mounted in the cabinet at the rear of said compartment so as to be in register with the telephone ear-piece when same is in position, a thermionic valve amplifier, connected electrically in circuit with said inductive coupling and housed within the cabinet, a press-button switch in the circuit, controlling the operation of said amplifier, said switch being mounted in the base of said U-shaped compartment and adapted to be operated by the telephone ear-piece resting thereon, the lower part of the front wall of the cabinet being provided with a recessed compartment which is shaped to receive the mouth-piece of the telephone, and a sound guide provided in the front wall of the cabinet between said upper and lower compartments, the lower part of said sound guide being in communication with the said lower compartment in the front wall of the cabinet, and the upper part of the sound guide being in communication with an opening in the front wall of the cabinet between said upper and lower compartments, the said sound guide being so shaped and arranged as to direct sound from the user of the device into the telephone mouth-piece.

8. An amplifying device for use with hand-set telephones comprising a cabinet having two side walls, a rear wall and a front wall which slopes rearwardly from the bottom of the cabinet to the top thereof, the upper part of the front wall having a recessed compartment of U-shape which forms a cradle to receive the telephone ear-piece, an inductive coupling mounted in the cabinet at the rear of said compartment so as to be in register with the telephone ear-piece when same is in position, a thermionic valve amplifier, connected electrically in circuit with said inductive coupling and housed within the cabinet, the lower part of the front wall of the cabinet being provided with a recessed compartment which is shaped to receive the mouth-piece of the telephone, and a sound guide provided in the front wall of the cabinet between said upper and lower compartments, said sound guide comprising a horn having its lower open end connected to the said lower compartment in the front wall of the cabinet and extending in curved form upwardly behind the said front wall and said wall having an opening disposed between said upper and lower compartments with which opening the upper open end of said horn communicates, the said sound guide being so shaped and arranged as to direct sound from the user of the device into the telephone mouthpiece.

JOHN CHARLES SYDNEY BRANSON.
LESLIE CLIFFORD BRANSON.

References Cited in the file of this patent

UNITED STATES PATENTS

| Number | Name | Date |
|---|---|---|
| 1,298,217 | Jenkins | Mar. 25, 1919 |
| 1,654,193 | Steuart | Dec. 27, 1927 |
| 2,214,992 | Chevassus | Sept. 17, 1940 |
| 2,500,264 | Souget | Mar. 14, 1950 |
| 2,501,955 | McWane | Mar. 28, 1950 |
| 2,528,636 | Cisin | Nov. 7, 1950 |